United States Patent
Said et al.

(10) Patent No.: US 8,401,035 B2
(45) Date of Patent: Mar. 19, 2013

(54) ONE WAY SRS INFORMATION TRANSMISSION METHOD

(75) Inventors: Ronald A. Said, Broken Arrow, OK (US); John S. Jones, Tulsa, OK (US); Sunil M. Gottipati, Broken Arrow, OK (US)

(73) Assignee: Level 3 Communications, LLC, Broomfield, CO (US)

(*) Notice: Subject to any disclaimer, the term of this patent is extended or adjusted under 35 U.S.C. 154(b) by 303 days.

(21) Appl. No.: 12/551,505

(22) Filed: Aug. 31, 2009

(65) Prior Publication Data

US 2011/0013646 A1     Jan. 20, 2011

Related U.S. Application Data

(63) Continuation-in-part of application No. 12/502,843, filed on Jul. 14, 2009, now Pat. No. 8,064,431.

(51) Int. Cl.
*H04L 29/02* (2006.01)

(52) U.S. Cl. .............. 370/465; 370/229; 370/395.21

(58) Field of Classification Search .......... 370/465, 370/468, 225, 466, 249, 315, 230; 715/735; 713/300
See application file for complete search history.

(56) References Cited

U.S. PATENT DOCUMENTS

| | | | |
|---|---|---|---|
| 5,557,608 A | 9/1996 | Calvignac et al. | |
| 5,757,784 A | 5/1998 | Liebowitz et al. | |
| 5,848,415 A | 12/1998 | Guck | |
| 5,905,522 A | 5/1999 | Lawler | |
| 5,974,439 A | 10/1999 | Bollella | |
| 6,430,187 B1 * | 8/2002 | Park | 370/397 |
| 6,446,125 B1 | 9/2002 | Huang et al. | |
| 6,798,756 B1 * | 9/2004 | Kosugi | 370/315 |
| 6,813,270 B1 | 11/2004 | Oz et al. | |
| 6,967,948 B2 | 11/2005 | Iacovino et al. | |
| 6,996,061 B2 | 2/2006 | Yang et al. | |
| 7,130,276 B2 * | 10/2006 | Chen et al. | 370/249 |
| 7,165,252 B1 | 1/2007 | Xu | |
| 7,249,165 B1 | 7/2007 | Lu et al. | |
| 7,252,439 B2 | 8/2007 | Takeuchi et al. | |
| 7,324,750 B2 | 1/2008 | Badt, Jr. | |
| 7,420,989 B2 | 9/2008 | Liu et al. | |
| 7,444,638 B1 | 10/2008 | Xu | |
| 7,522,633 B2 * | 4/2009 | Ichino | 370/466 |
| 7,535,831 B2 | 5/2009 | Phelps et al. | |
| 7,559,073 B2 | 7/2009 | Marler et al. | |
| 7,560,111 B2 | 7/2009 | Kao et al. | |
| 7,573,847 B2 | 8/2009 | Rogers et al. | |
| 7,593,425 B2 * | 9/2009 | Karakawa et al. | 370/466 |

(Continued)

OTHER PUBLICATIONS

European Patent Office PCT International Search Report, International Application PCT/US2010/041687, mailed Aug. 31, 2010.

(Continued)

*Primary Examiner* — Michael Thier
*Assistant Examiner* — Vincelas Louis

(57) ABSTRACT

An exemplary method of one way transmission of information is provided, the exemplary method steps preferably include partitioning a portion of each network device along a transmission path (based on a configuration of a source adaptive translation device), to form a source dedicated one way transmission path, analyzing source customer supplied information received by the source adaptive translation device to discern the source supplied information format, mapping the source discerned supplied information into a first synchronous transport signal using the source adaptive translation device, transmitting the first synchronous transport signal across the source dedicated one way transmission path, receiving the first synchronous transport signal at a destination adaptive destination device, and remapping the received first synchronous transport signal back into the discerned source supplied information using the destination adaptive translation device.

16 Claims, 6 Drawing Sheets

U.S. PATENT DOCUMENTS

| | | | |
|---|---|---|---|
| 7,770,200 B2 | 8/2010 | Brooks et al. | |
| 7,787,494 B1* | 8/2010 | Aubin et al. | 370/468 |
| 2003/0117951 A1* | 6/2003 | Wiebe et al. | 370/225 |
| 2004/0208122 A1* | 10/2004 | McDysan | 370/230 |
| 2006/0206422 A1 | 9/2006 | Mashinsky | |
| 2007/0258361 A1* | 11/2007 | McEwen | 370/229 |
| 2008/0075069 A1* | 3/2008 | Fourcand | 370/357 |
| 2008/0120552 A1* | 5/2008 | Dagan et al. | 715/735 |
| 2008/0130627 A1* | 6/2008 | Chen et al. | 370/351 |
| 2009/0144568 A1* | 6/2009 | Fung | 713/300 |
| 2010/0189174 A1 | 7/2010 | Potdar et al. | |
| 2010/0271951 A1 | 10/2010 | Dujardin et al. | |
| 2012/0026874 A1* | 2/2012 | McEwen | 370/231 |
| 2012/0033971 A1* | 2/2012 | Fourcand | 398/54 |

OTHER PUBLICATIONS

European Patent office PCT Written Opinion, International Application PCT/US2010/041687, mailed Aug. 31, 2010.

* cited by examiner

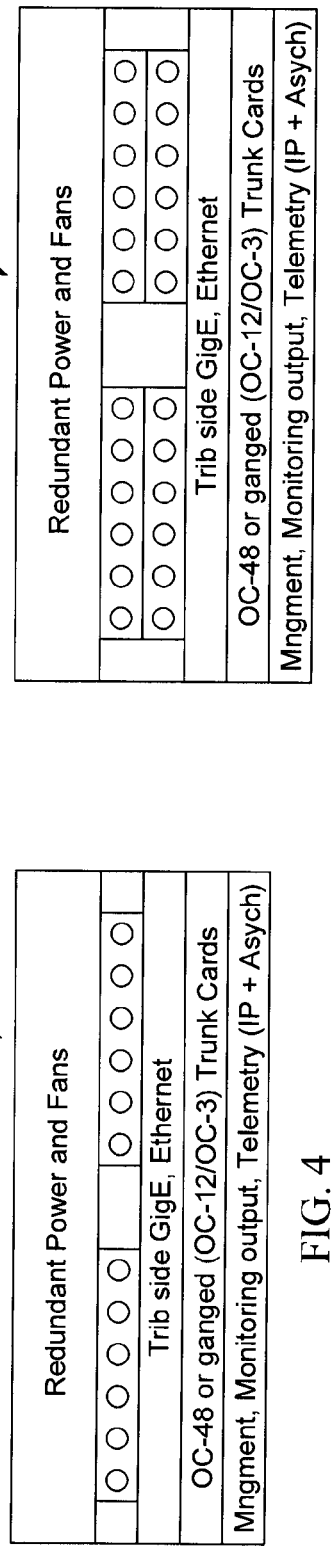
FIG. 4
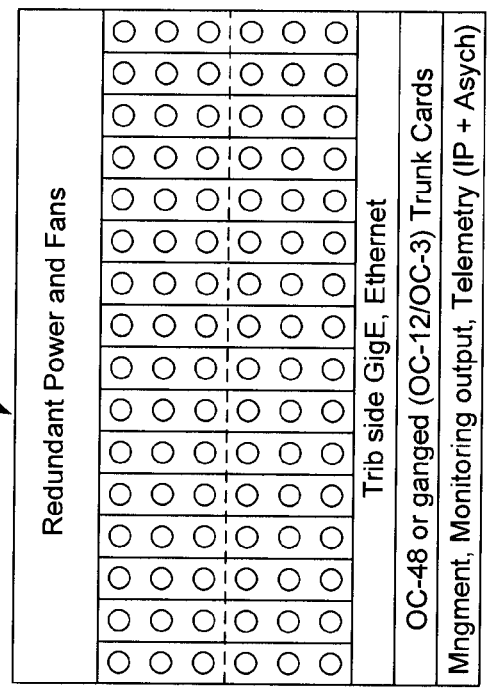
FIG. 5
FIG. 6

ONE WAY SRS INFORMATION TRANSMISSION METHOD

CROSS REFERENCE TO RELATED APPLICATION

This application claims the benefit of priority to and is a continuation-in-part of U.S. patent application Ser. No. 12/502,843, entitled One Way Information Transmission Method, filed Jul. 14, 2009. The aforementioned patent application is assigned to an entity common hereto, and the entirety of the aforementioned patent application is incorporated herein by reference for all purposes.

FIELD OF THE INVENTION

This invention relates to information transmission methods, and in particular, but not by way of limitation, to a one way information transmission method and apparatus of file based video content information using a static resource schema (SRS) across a backbone utilizing an ASI transmission format.

BACKGROUND

As demands for the transfers of large blocks of information across the information network backbone (including real time transfer of information laden with video content) continue to increase and pricing pressures continue to bear down on service providers more efficient and cost effective methods of information transmission are demanded by the market.

Accordingly, challenges remain and a need persists for improvements in methods and apparatuses for use in accommodating effective and efficient deployment and use of information system networks, information transmission methodologies, and transmission service pricing.

SUMMARY OF THE INVENTION

In accordance with exemplary embodiments, a one way information transmission method is provided. In an exemplary embodiment, the method steps include at least analyzing customer supplied information to determine a format to be selected, transmission priority, available transmission resources, and transmission destination commensurate with the customer supplied information. In an exemplary embodiment, the steps further include determining a media transport method based on the transmission priority, transmission destination, and available transmission resources, scheduling transmission of an information payload portion of the customer supplied information as a pre-emptible data reservation based on a determined media transport method, and transforming the information payload of the customer supplied information into a selected format. A skilled artisan will understand that a reservation embodies pre-scheduling facilities and bandwidth based on the customer's needs for an agreed to future event. The exemplary method additionally includes the steps of storing the information payload in its selected formatted form on a non-volatile storage medium, encapsulating the information payload in its selected format within a media transport format, transmitting the encapsulated information payload to the transmission destination, determining receipt of the encapsulated information payload at the transmission destination, and requesting re-transmission of any missing encapsulated information payload.

In the exemplary embodiment, the format to be selected is determined by the steps of receiving a customer request for a transmission service to transmit customer supplied information, determining whether customer supplied information is file based or video stream based information, advising the customer of available compression facilities consistent with the customer supplied information, discerning whether the customer selected a compression facility from the available compression facilities, and linking the selected compression facility to the customer supplied information.

To assure the customer's transmission service needs are identified and carried out, the exemplary method also included the steps of determining whether the information payload is presented in a compressible format, ascertaining a file size of information payload, identifying a required delivery time for the information payload, establish a service priority based on the file size and requested delivery time, confirming an availability of transport facilities, and supplying a price to the customer for transmission service options.

In an exemplary embodiment, the price includes at least a price quote for an earliest in time transmission of the information payload in the compressible format, a price quote for a delayed in time transmission of the information payload in the compressible format, a price quote for an earliest in time transmission of the information payload in a compressed format, and a price for a delayed in time transmission of the information payload in a compressed format.

In an exemplary embodiment, once the final format and delivery instructions have been received from the customer, based on supplied price, the transmission service is preformed and conformation of the transmission is provided to the customer. However, prior to transmission of the information payload, the scheduling step of an exemplary embodiment includes the steps of analyzing the customer supplied information to determine an applicability of a pre-emptible data reservation to the information payload, advising the customer of the availability of pre-emptible data reservations, associating a pre-emptible data reservation with the information payload consistent with the customer selected pre-emptible data reservation, scheduling transmission of the information payload based on availability of transmission resources, and rescheduling transmission of the information payload when a non-pre-emptible information payload preempts the pre-emptible information payload.

In a further exemplary embodiment, an apparatus configured to obtain a signal path between a source adaptive translation device entry point and a destination adaptive translation device destination point, the exemplary apparatus includes at least a computer based controller configured to partition a portion of each network device along a transmission path (based on a configuration of the source adaptive translation device), to form a source dedicated one way transmission path, analyze source customer supplied information received by the source adaptive translation device to discern the source supplied information format, map the source discerned supplied information into a first synchronous transport signal using the source adaptive translation device, transmit the first synchronous transport signal across the source dedicated one way transmission path, receive the first synchronous transport signal at the destination adaptive destination device, and remapping the received first synchronous transport signal back into the discerned source supplied information using the destination adaptive translation device, wherein the source dedicated one way transmission path communicates with the source adaptive translation device on a proximal end of the destination dedicated one way transmission path, and with the destination adaptive translation device on a distal end of the destination dedicated one way transmission path.

These and various other features and advantages that characterize the claimed invention will be apparent upon reading the following detailed description and upon review of the associated drawings.

BRIEF DESCRIPTION OF THE DRAWINGS

FIG. 4 shows an exemplary diagram of an adaptive translation device of the present invention.

FIG. 5 shows an alternate exemplary diagram of an adaptive translation device of the present invention.

FIG. 6 shows an alternative exemplary diagram of an adaptive translation device of the present invention.

DETAILED DESCRIPTION OF A PREFERRED EMBODIMENT

Detailed descriptions of exemplary embodiments are provided herein. It is to be understood, however, that the invention may be embodied in various forms. Various aspects of the invention may be inverted, or changed in reference to specific part shape and detail, part location, or part composition. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1A:
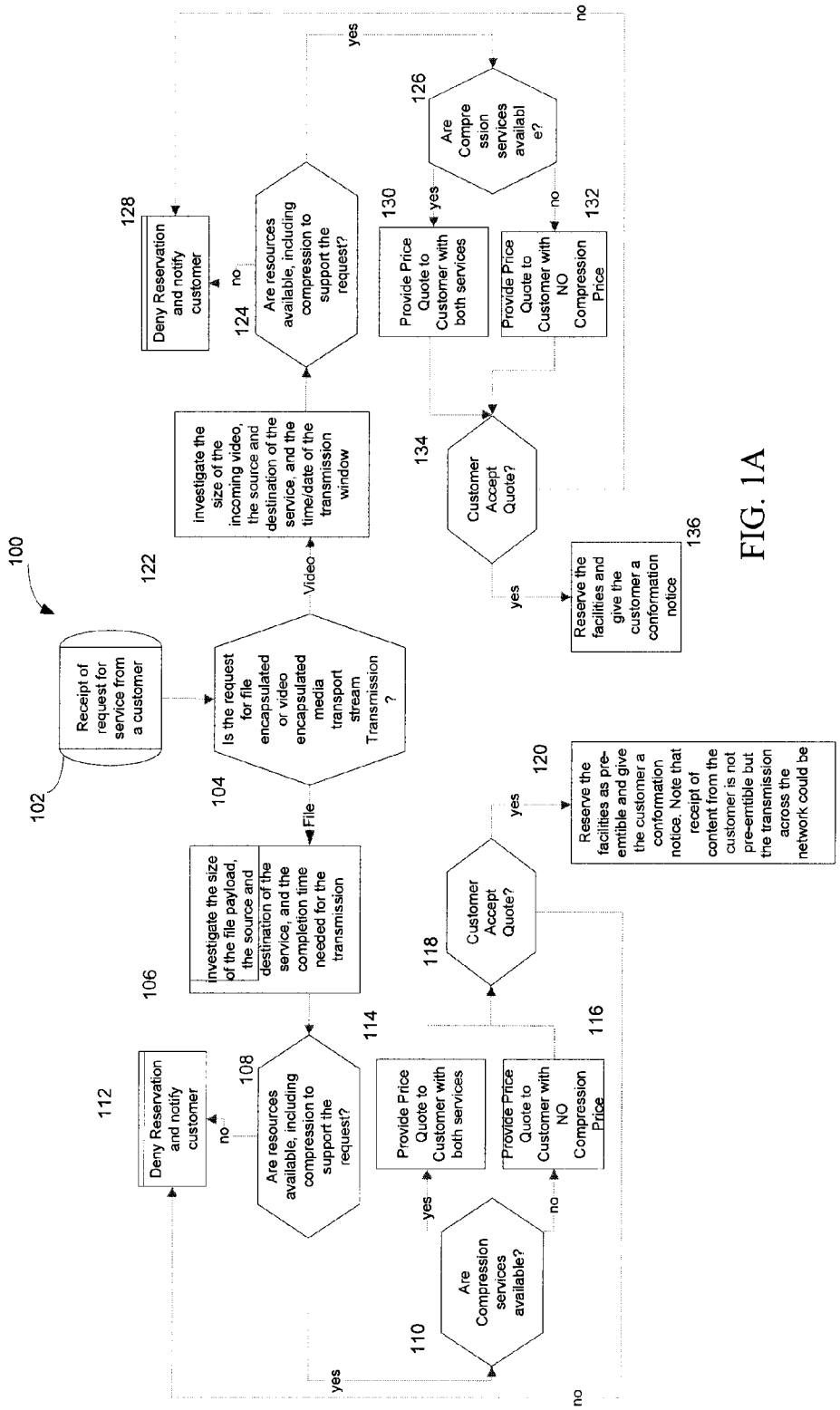
FIG. 1A shows a first portion (the reservation of the facilities for the payload) of a flowchart of using an inventive one way information transmission method.

Reference will now be made in detail to one or more exemplary embodiments of the invention, as those embodiments are depicted in the figures. Each example is provided by way of explanation of the invention, and not meant as a limitation of the invention. FIG. 1A shows a exemplary embodiment of an inventive one way transmission method 100 that preferably commences with receipt of a customer request for service, including a request for transmission of the information payload portion of the customer supplied information. In the exemplary embodiment, the customer service request is received via a network access unit at process step 102.

At process step 104, the received information is evaluated to determine whether the request is for file encapsulated or video encapsulated media transport stream transmission. In the exemplary embodiment, both transmissions will use a media stream, such as DVB ASI, for transmission, but file encapsulated will encapsulate the file into a media stream, while video encapsulation will encapsulate the video into a media stream. When the request is for the content to be file encapsulated, the process proceeds to process step 106. At process step 106, an investigation is made regarding the size of the file payload, the source and destination availability, and the completion time needed for the transmission. With that information in hand the exemplary process proceeds to process step 108. At 108, If the requested source or destination is not available, or the requested delivery time cannot be achieved, or the transmission resources are unavailable either to meet the requested time of delivery, or the window for transmission is too short for the file size for delivery to the requested destination within the requested time, the process proceeds to process step 112, and the customer is notified of a reservation denial and the reason for the denial. However, if the requested source and destination, delivery time, and transmission resources are available for the file size, the process proceeds to process step 110. At process step of 110, resources are checked to see if compression services are available. If compression services are available the process proceeds to step 114 where a Price is provided to the customer for file transfer as compressed or uncompressed. If compression services are not available the process proceeds to step 116 where a Price is provided to the customer for file transfer with no compression. Once the price has been given to the customer the process proceeds to process step 118 where the customer decides to accept the Price quote or not. If the customer does not accept the price quote the process reverts to process step 112 and the reservation is denied. If however, the customer accepts the Price quote the process proceeds to process step 120 where the network facilities are reserved, but can be preempted, and the customer is given a confirmation notice of the upcoming transmission. In this service, receiving the customer's payload, at the pre-arranged time, will not be delayed or interrupted by other services, but transferring across the network could be delayed.

Referring to process step 104 of the exemplary process, when the request is for the content to be video encapsulated, the process proceeds to process step 122. At process step 122, an investigation is made regarding the size of the video payload, the source and destination availability, and the time/date of the transmission window. With that information in hand the process proceeds to process step 124. At 124, if the requested source or destination is not available, or the requested time/date delivery window is not available, or the transmission resources are unavailable to carry that size of the video, or with the video compressed, the process proceeds to process step 128, and the customer is notified of a reservation denial and the reason for the denial. However, if the requested source and destination, delivery time, and transmission resources are available for the video payload, the exemplary process proceeds to process step 126. At process step of 126, resources are checked to see if compression services are available. If compression services are available the process proceeds to process step 130 where a Price is provided to the customer for video transmission as compressed or uncompressed. If compression services are not available the process proceeds to process step 132 where a Price is provided to the customer for video transmission with no compression. Once the price has been given to the customer the process progresses to process step 134, where the customer decides to accept the Price quote or not. If the customer does not accept the price quote to process reverts to step 128 and the reservation is denied. If however, the customer accepts the Price quote the process proceeds to process step 136 where the network facilities are reserved, and the customer is given a confirmation notice of the upcoming transmission.

Figure 1B:
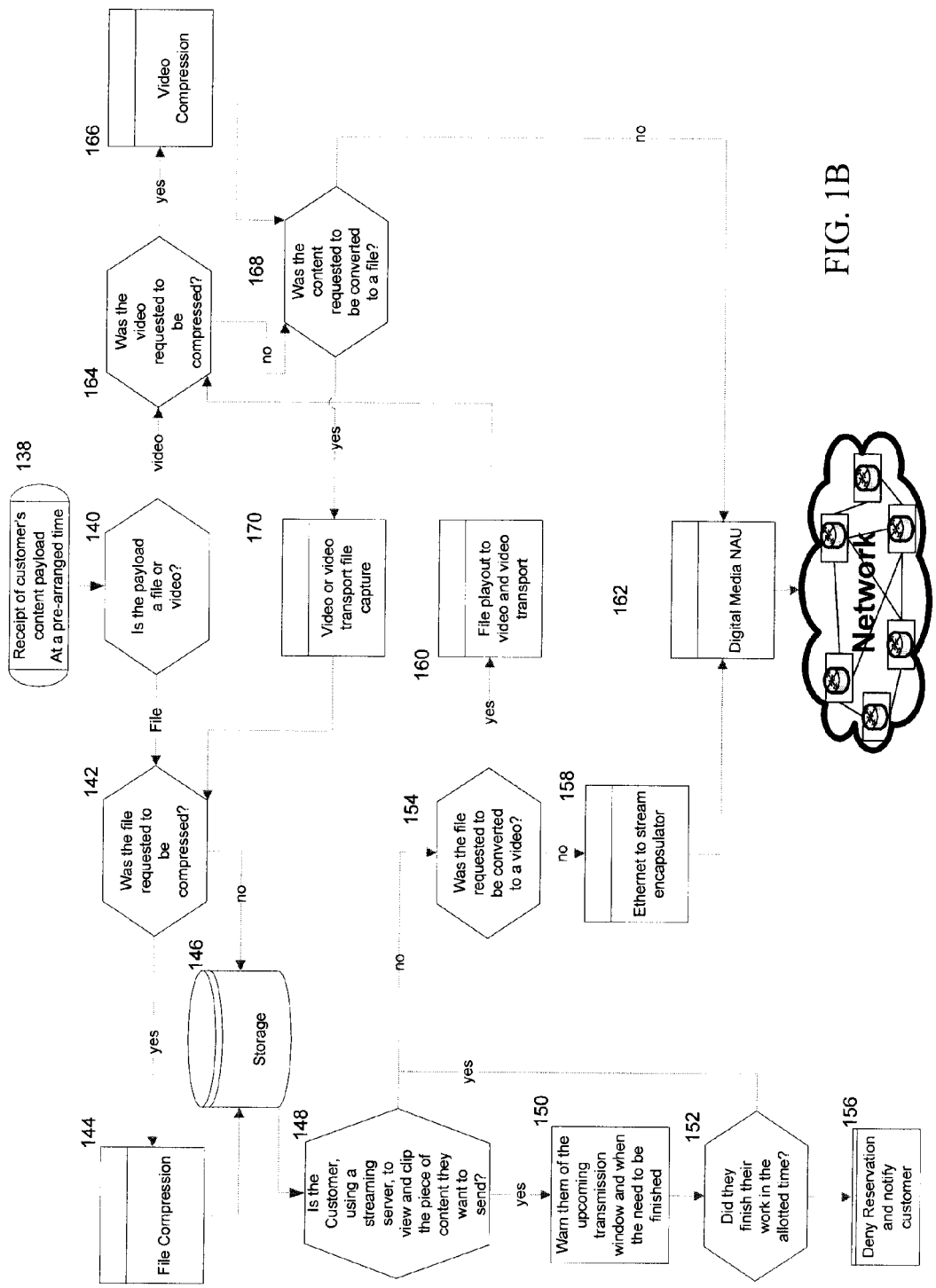
FIG. 1B shows a second portion (the movement of the payload) of the flowchart of using the inventive one way information transmission method of FIG. 1A.
Figure 1C:
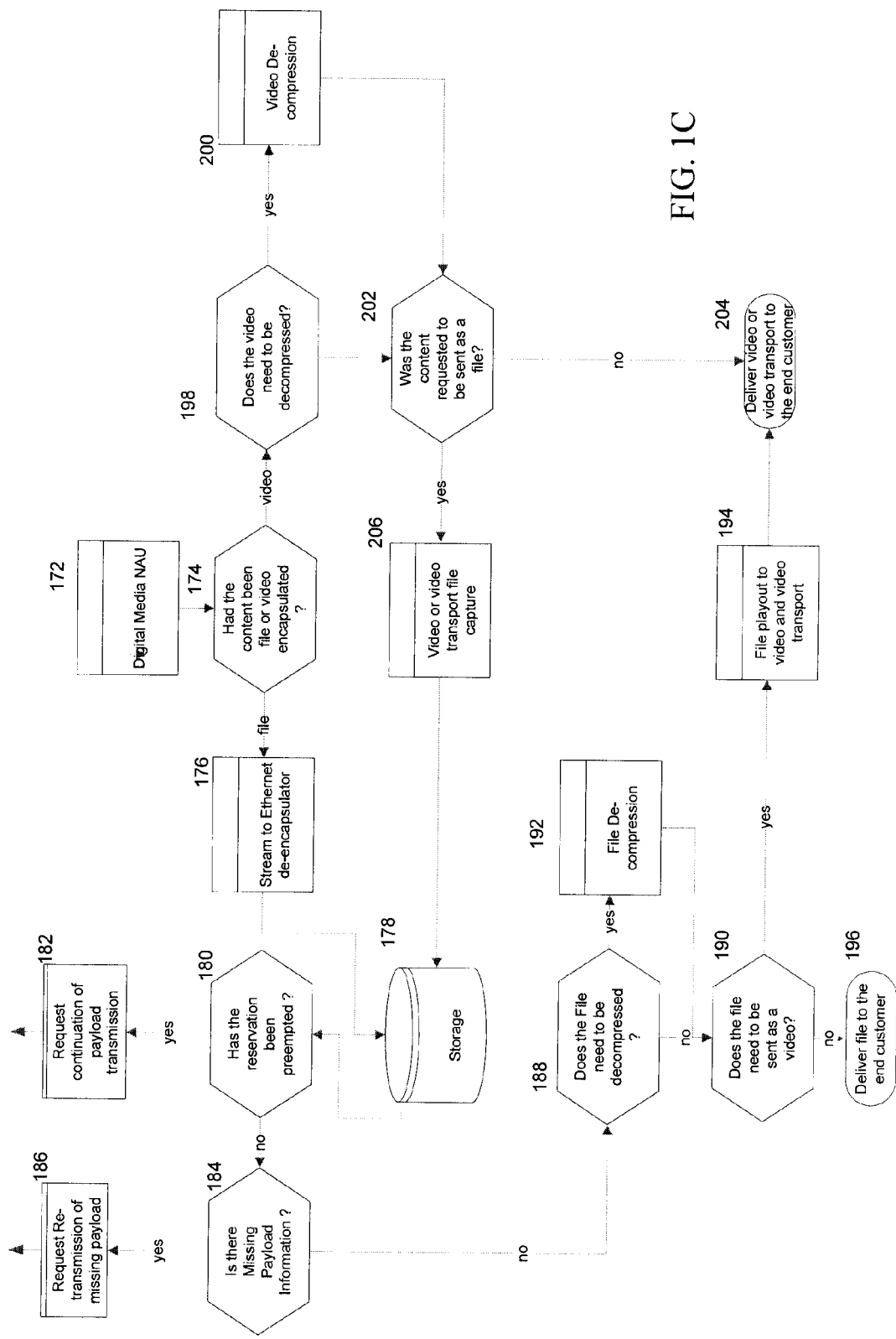
FIG. 1C shows a third portion (the movement of the payload) of the flowchart of using the inventive one way information transmission method of FIGS. 1A and 1B.

If the service has been agreed to and the facilities booked for the services, then, in FIGS. 1B and 1C, the next step is process step 138, where at a pre-arranged time, the customer's content payload is received, the routing of the payload begins and the exemplary process progresses to step 140. At 140, if the payload handed off is a file, the process advances forward to step 142. At 142, the customer's requirement is examined to see if compression service was requested and arranged. If arrangements were made for file compression services then the process advances to process step 144. At 144, the file is compressed and moved on to file storage at process step 146. However, if compression services were not requested, the exemplary process proceeds to process step 142 directly to storage at step 146. Up to this stage the payload has been processed directly, with no delay or interruption. After the file has been stored, it is made available for the customer to manipulate during process step 148. At 148, the customer can use a streaming server to view, clip or manipulate any piece of content before it is released for transmission. The customer can work with their file up until a predetermined time where the file needs to be prepared for transmission. At process step 148, the system monitors the customer's activities and determines if the customer is working on the content. If the customer is working on the content, the process diverts to process step 150 where the customer will be warned of the upcoming transmission window and when they need to discontinue their manipulation task. Following process step 150, the process proceeds to process step 152 where it is determined if the customer completed their file manipulation. If the customer was still manipulating the file once the transmission window time had arrived the exemplary process proceeds to process step 156. At 156, since the customer was not ready for the transmission, the customer is denied the reservation of facilities, the facilities are made available for other services, and the customer is notified that the file transfer has been denied since they were still manipulating the file.

However, if at process step 152, the customer has completed their work, the exemplary process moves to process step 154, which is the start of the transmission window and the file transfer commences.

If at process step 148 the customer was not working with their file once the transmission window arrived, the process proceeds directly to process step 154. At process step 154, a determination is made whether a request to convert the file to a video file is present. If the file was not requested to be changed to a video, the process advances to process step 158, where the file is encapsulated into a media stream. After the file has been encapsulated, the file is transferred into the Digital Media Network Adaptor Unit at process step 162, and the payload has a transport wrapper applied and then sent out onto the transport network. This payload will be transported across the transmission network as a file encapsulated media transport stream that can be pre-empted by other content that is non-pre-emptible and is vying for the same facility at the same time.

If at process step 154, the file was requested to be converted to a video, the process diverts to process step 160. At process step 160, the file would be played out to either become a video stream or a video transport stream. After process step 160 has been completed, the process would proceed to process step 164, taking it through the video transmission preparation process steps.

Referring to process step 140, if the payload handed off is a video, the process advances to process step 164. At process step 164, the process determines if a request was made and facilities were arranged for the video to be compressed. If facilities were arranged for video compression then the process proceeds to process step 166. At process step 166, the video is compressed and the process proceeds to process step 168. If at process step 164 there was no request for video compression then the process would proceed directly to process step 168. At process step 168, the process determines if there was a request for the content to be converted to a file. If the content was requested to be turned into a file the process diverts to process step 170. At process step 170, the video or video stream will be captured and changed into a file format.

However, if there was no request for the content to be converted to a file at process step 168, then the process proceeds to process step 162. At process step 162, the content would be moved into the Digital Media Network Adaptor Unit, the payload has a transport wrapper applied, and is sent out onto the transport network. This payload will be transported across the transmission network as a non-pre-emptible video encapsulated media transport stream.

After the payload has moved through the transport network the process continues at process step 172. At process step 172, the payload moves through the Digital Media Network Adaptor Unit where the payload has the transport layer removed and the payload is advanced to process step 174. At process step 174, the process determines if the content had been file encapsulated or video encapsulated. If the content had been file encapsulated, the process proceeds to process step 176 where the content is passed through a stream to Ethernet de-encapsulator. At process step 178, the now Ethernet payload is placed into storage. Once in storage the process analyzes the content and proceeds to process step 180. At process step 180, the process determines if the file had been pre-empted and that the transmission had been terminated before completion. If the file had been pre-empted the process moves to process step 182. At process step 182, a request is made to the control system for a continuation of the payload transmission. The process would revert to process step 146, where the file is kept, determine where the file was pre-empted and set up a reservation to allow the continuation of the file transfer to continue. The process would then advance forward from step 146 as it did before, but now with the remainder of the file.

However, if in process step 180, it is determined that the file had not been pre-empted, the process continues at process step 184. At process step 184, the process determines if there are any missing payload information. If it is determined that there is missing payload information then the process advances to process step 186. At process step 186, a request is made to the control system for a retransmission of the missing or corrupt payload, and the process reverts to process step 146, where the file is kept, determine what payload information is needed and set up a reservation to allow the completion of the file transfer. The process would start moving forward from step 146 as it did before, but now with the remainder of the file.

However, if at process step 184, it is determined that the file had all the required payload information then the process continues to process step 188. At process step 188 the process determines, based on the requirements of the customer, if the file needs to be decompressed. If the file needs to be decompressed the process moves to process step 192, where the file is decompressed. After file decompression the process moves onto process step 190. If the file did not need to be decompressed, the process would move the file directly to process step 190 from process step 184.

At process step 190, the process determines, based on the requirements of the customer, if the file needs to be delivered as a video. If the file needs to be delivered as video, the process moves to process step 194. At process step 194, the file is played out to either a video or video transport stream. After process step 194, the process moves forward to process step 204 where the video or video transport is delivered to the end customer. At process step 190, if the video does not need to be delivered as a video then the process moves forward to process step 196, where the file is delivered to the end customer.

Reverting to process step 174, if the content had been video encapsulated then the process proceeds to process step 198. At process step 198, the process determines if the video needs to be decompressed. If the video needs to be decompressed the process advances to process step 200. At process step 200, the video is decompressed and the process moves to process step 202. If at process step 198 it is determined that the video does not need to be decompressed then the process proceeds directly to process step 202. At process step 202 the process determines if the customer requested that the content be sent as a file. If it is determined that the content needs to be sent as a file then the process advances to process step 206. At process step 206, the video or video transport is captured to a file and the content is moved to storage at step 178. Once in storage, it follows the same process listed above.

However, if in step 202, the customer did not request the media content to be sent as a file, then the process proceeds to process step 204. At process step 204, the video or video transport is delivered to the end customer.

Figure 2:
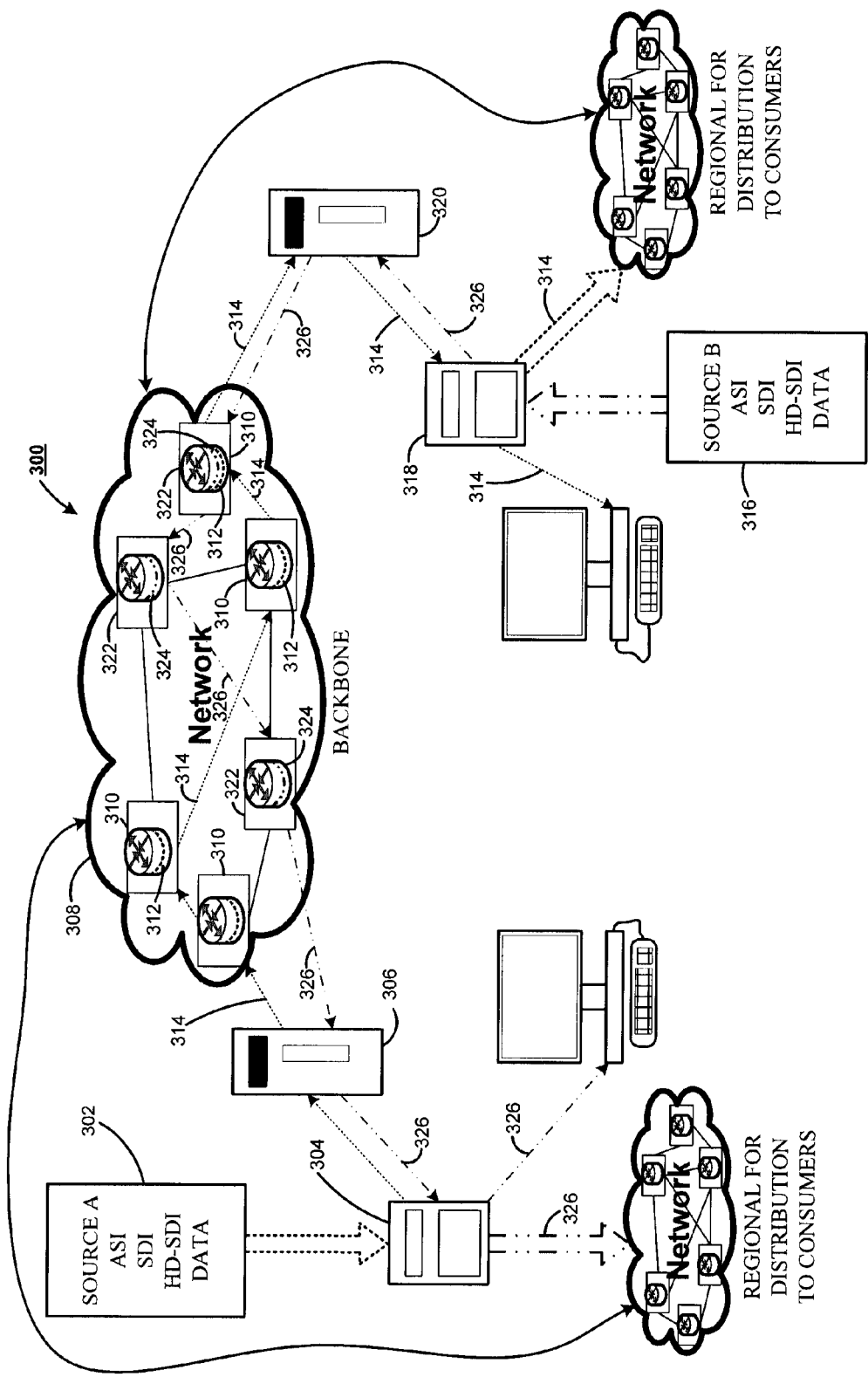
FIG. 2 illustrates an exemplary network configured to accommodate the present invention.

Turning to FIG. 2, shown therein is an exemplary alternate embodiment of the present static resource schema (SRS) one way information transmission system 300 that includes at least, an information source 302 communicating with an exemplary source adaptive translation device 304. In a first transmission direction, the source adaptive translation device 304, communicates with a first edge router 306. Prior to the transmission of information across a network backbone 308, the source adaptive translation device 304, identifies each device 310, in the network backbone 308, which will participate in the information transmission from the source adaptive translation device 304. With each device 310 identified, a controller within the source adaptive translation device 304, directs each device 310 to partition a portion 312, of the devices 310 resource to form a source dedicated one way transmission path 314.

FIG. 2, the static resource schema (SRS) one way information transmission system 300 also includes at least, a second information source 316, communicating with an exemplary destination adaptive translation device 318. In a second transmission direction, the destination adaptive translation device 318, communicates with a second edge router 320. Prior to the transmission of information across a network backbone 308, the destination adaptive translation device 318, identifies each device 322, in the network backbone 308, which will participate in the information transmission from the destination adaptive translation device 318. With each device 322 identified, a controller within the destination adaptive translation device 318, directs each device 322 to partition a portion 324, of the devices 322 resource to form a destination dedicated one way transmission path 326.

Figure 3:
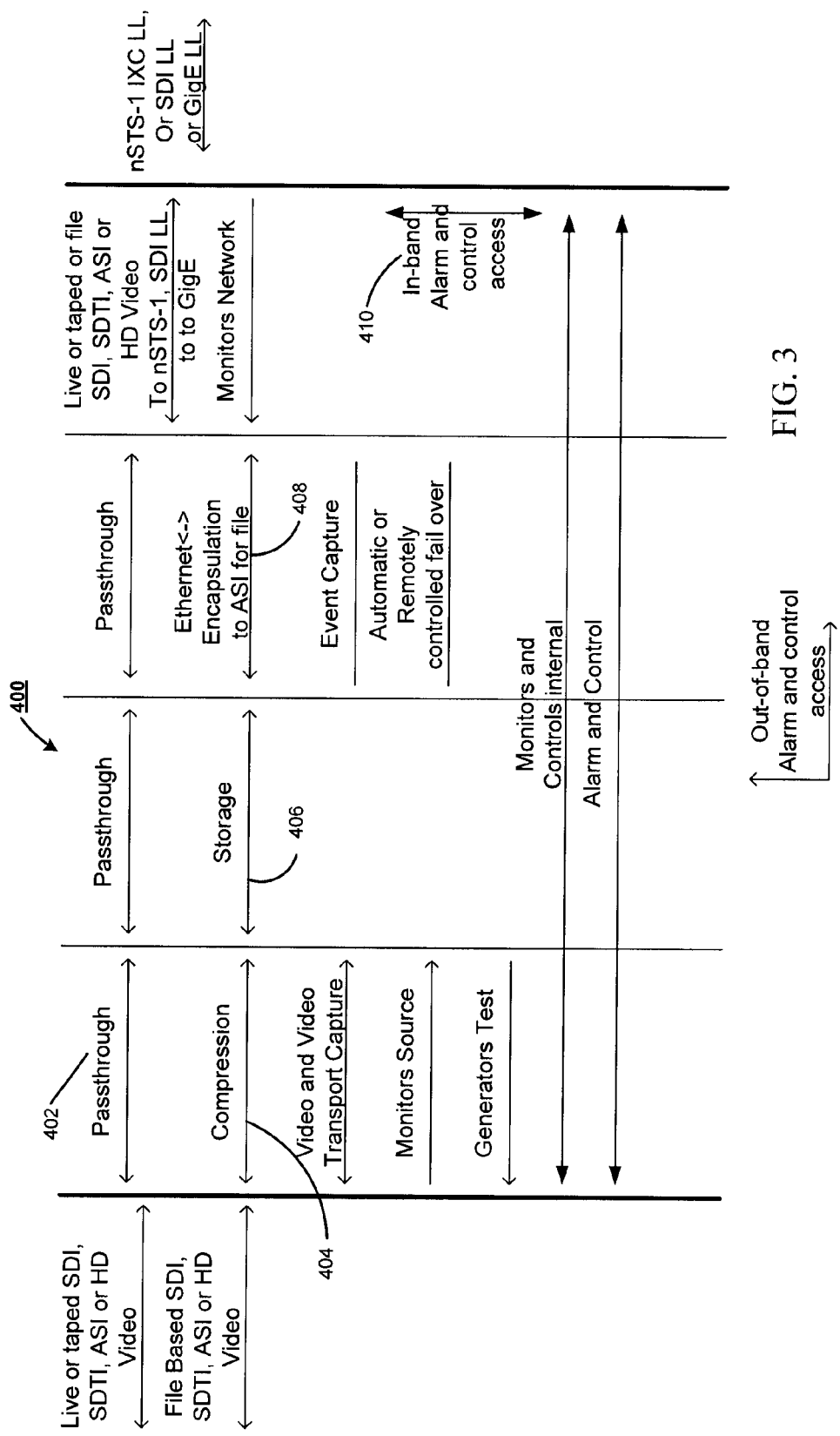
FIG. 3 reveals an exemplary service flow diagram of control schema for the present invention.

FIG. 3 illustrates a control schema 400 for each the source and destination adaptive translation devices 304 and 318. The control schema supports at least a passthrough capabilities 402, signal compression 404, data storage 406, encapsulation facilities, and in-band alarm and control access 410. As such, each the source and destination adaptive translation devices 304 and 318 is configured such that the devices 304 and 318, adapt user provided ASI/SDI/SDTI/HD-SDI signals and maps them into Sonet STS-1(s) based on the amount of bandwidth required, will provide for multiple ASI/SDI/SDTI/HD-SDI signals to be adapted into Sonet circuits including but not limited to DS3, OC3, OC12, OC48 and OC192s, have the capability to multiplex and de-multiplex Video traffic and Ethernet data traffic, Additionally, the adaptive translation devices 304 and 318 have a control and monitoring module that supports in-band and out-of-band management access to the device and also provides a way to monitor video traffic from any of the video interfaces, include a chassis that support redundant power supplies, fans and Sonet trunk modules, and detect null packets in an ASI transport stream at the ingress node, discard them and add them back in at the egress node.

FIGS. 4-6 show that the adaptive translation devices 304 and 318 are configured to support three transmit, three receive auto sensing ASI/SDI/HD ports per slot 500, in which each ASI can take up (1-5) STS1 timing slots and each SDI takes up six STS-1 timing slots into a permanent backplane supported by a chassis 502, and auto-sense if the input is SDI/SDTI/ASI/HD-SDI or data. All slots in the backplane support hot swappable exchange of modules, while the backplane itself is configurable to support at least 10 gigabytes per second of traffic.

In operation the adaptive translation devices 304 and 318 will only be allowed with embedded audio, and allow the ability to delay each feed independently and up to 1 second. An associated service management program will allow dynamic provisioning of the STS1s throughout the network and feature control and monitoring system where both ends are smart and very little traffic flows between them.

In an exemplary embodiment, a dynamic fan systems is included where fans run at ⅓ capacity for 3 fans, but 1 fan carries the full cooling load, thereby providing redundant cooling fans, and any port has the ability to rout to any like port. An additional feature of the adaptive translation devices 304 and 318 is that any video IN port can be routed to the monitoring port to help isolate issues, and in an exemplary network the adaptive translation devices 304 and 318 are used for the on and off ramps of services of the application layer. For a chassis of the adaptive translation devices 304 and 318, such as that shown by FIG. 4, the chassis may have only one working OC-3 card but can offer a second OC-3 card as redundancy, but in all cases the telemetry has the ability to be in-band or out of band.

It is to be understood that even though numerous characteristics and advantages of various embodiments of the present invention have been set forth in the foregoing description, together with details of the structure and function thereof, this detailed description is illustrative only, and changes may be made in detail, especially in matters of structure and arrangement of steps within the principles of the invention, to the full extent indicated by the broad general meaning of the terms in which the appended claims are expressed.

What is claimed is:

1. A method of one way transmission of information by steps comprising:
    partitioning a portion of each network device along a transmission path, based on a configuration of a source adaptive translation device, to form a source dedicated one way transmission path;
    analyzing source customer supplied information received by the source adaptive translation device to discern the source supplied information format, wherein the source supplied information format is at least one of ASI, SDI, SDTI, or HD-SDI;
    mapping the source discerned supplied information into a first synchronous transport signal using the source adaptive translation device, the first synchronous transport signal including a video encapsulation or file encapsulation of the supplied information;
    transmitting the first synchronous transport signal across the source dedicated one way transmission path;
    receiving the first synchronous transport signal at a destination adaptive destination device; and remapping the received first synchronous transport signal back into the discerned source supplied information using the destination adaptive translation device, wherein the source dedicated one way transmission path communicates with the source adaptive translation device on a proximal end of the source dedicated one way transmission path, and with the destination adaptive translation device on a distal end of the source dedicated one way transmission path.

2. The method of claim 1, by steps further comprising:

partitioning a portion of each network device along a transmission path, based on a configuration of a destination adaptive translation device, to form a destination dedicated one way transmission path;

analyzing destination customer supplied information received by the destination adaptive translation device to discern the destination supplied information format;

mapping the discerned destination supplied information into a second synchronous transport signal using the destination adaptive translation device;

transmitting the second synchronous transport signal across the destination dedicated one way transmission path;

receiving the second synchronous transport signal at the source adaptive destination device; and remapping the received second synchronous transport signal back into the discerned destination supplied information using the source adaptive translation device, wherein the destination dedicated one way transmission path communicates with the source adaptive translation device on a distal end of the destination dedicated one way transmission path, and with the destination adaptive translation device on a proximal end of the destination dedicated one way transmission path.

3. The method of claim 2, wherein the destination supplied information format is ASI.

4. The method of claim 2, wherein the destination supplied information format is SDI.

5. The method of claim 2, wherein the destination supplied information format is SDTI.

6. The method of claim 2, wherein the destination supplied information format is HD-SDI.

7. An apparatus configured to obtain a signal path between a source adaptive translation device entry point and a destination adaptive translation device destination point, the apparatus comprising a computer based controller configured to:

partition a portion of each network device along a transmission path, based on a configuration of the source adaptive translation device, to form a source dedicated one way transmission path;

analyze source customer supplied information received by the source adaptive translation device to discern the source supplied information format, wherein the source supplied information format is at least one of ASI, SDI, SDTI, or HD-SDI;

map the source discerned supplied information into a first synchronous transport signal using the source adaptive translation device, the first synchronous transport signal including a video encapsulation or file encapsulation of the supplied information;

transmit the first synchronous transport signal across the source dedicated one way transmission path;

receive the first synchronous transport signal at the destination adaptive destination device; and remap the received first synchronous transport signal back into the discerned source supplied information using the destination adaptive translation device, wherein the source dedicated one way transmission path communicates with the source adaptive translation device on a proximal end of the destination dedicated one way transmission path, and with the destination adaptive translation device on a distal end of the destination dedicated one way transmission path.

8. The apparatus of claim 7, in which the computer based controller configured to further:

partition a portion of each network device along a transmission path, based on a configuration of the destination adaptive translation device, to form a destination dedicated one way transmission path;

analyze destination customer supplied information received by the destination adaptive translation device to discern the destination supplied information format;

map the discerned destination supplied information into a synchronous transport signal using the destination adaptive translation device;

transmitting the synchronous transport signal across the destination dedicated one way transmission path;

receiving the synchronous transport signal at the source adaptive destination device; and remapping the received synchronous transport signal back into the discerned destination supplied information using the source adaptive translation device, wherein the destination dedicated one way transmission path communicates with the source adaptive translation device on a distal end of the destination dedicated one way transmission path, and with the destination adaptive translation device on a proximal end of the destination dedicated one way transmission path.

9. The apparatus of claim 8, in which the destination adaptive translation device comprises a backplane configured to communicate with at least one hundred and ninety two STI-1 transport trunk modules, and in which the backplane is further configured to communicate with an ethernet data service interface module, wherein the ethernet data service interface module is configured to accommodate data transmissions at a rate of not less than 1 gigabit per second.

10. The apparatus of claim 8, in which the destination adaptive translation device further comprises;

a chassis;

redundant power supplies attached to the chassis;

redundant cooling modules secured to the chassis and in fluid communication with the redundant power supplies; and wherein the backplane is further configured to support redundant STI-1 transport trunk modules.

11. The apparatus of claim 10, further comprises a null packets detection circuit communicating with the backplane for detection of null packets in an ASI transport stream and discard said null packets prior to transmission of the second synchronous transport signal.

12. The apparatus of claim 7, in which the source adaptive translation device comprises a backplane configured to communicate with at least one hundred and ninety two STI-1 transport trunk modules.

13. The apparatus of claim 12, in which the backplane is further configured to communicate with an ethernet data service interface module.

14. The apparatus of claim 13, in which the ethernet data service interface module is configured to accommodate data transmissions at a rate of not less than 1 gigabit per second.

15. The apparatus of claim 7, in which the source adaptive translation device further comprises;

a chassis;

redundant power supplies attached to the chassis;

redundant cooling modules secured to the chassis and in fluid communication with the redundant power supplies; and wherein the backplane is further configured to support redundant STI-1 transport trunk modules.

16. The apparatus of claim 15, further comprises a null packets detection circuit communicating with the backplane for detection of null packets in an ASI transport stream and discard said null packets prior to transmission of the first synchronous transport signal.

* * * * *